(12) United States Patent
Khanna et al.

(10) Patent No.: US 7,969,167 B2
(45) Date of Patent: Jun. 28, 2011

(54) CAPACITANCE-TO-VOLTAGE INTERFACE CIRCUIT WITH SHARED CAPACITOR BANK FOR OFFSETTING AND ANALOG-TO-DIGITAL CONVERSION

(75) Inventors: Ashish Khanna, Maricopa, AZ (US); Sung Jin Jo, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 350 days.

(21) Appl. No.: 12/360,934

(22) Filed: Jan. 28, 2009

(65) Prior Publication Data

US 2010/0188107 A1 Jul. 29, 2010

(51) Int. Cl.
*G01R 27/26* (2006.01)
(52) U.S. Cl. .......... 324/686; 341/161; 341/172; 327/94; 324/678
(58) Field of Classification Search ............. 324/686
See application file for complete search history.

(56) References Cited

U.S. PATENT DOCUMENTS

| | | | |
|---|---|---|---|
| 4,195,282 A | | 3/1980 | Cameron |
| 4,803,462 A | | 2/1989 | Hester et al. |
| 5,889,486 A | * | 3/1999 | Opris et al. ............ 341/150 |
| 5,977,803 A | * | 11/1999 | Tsugai ................... 327/94 |
| 6,316,948 B1 | * | 11/2001 | Briefer .................. 324/678 |
| 6,316,958 B1 | | 11/2001 | Jenkins, IV |
| 6,522,277 B2 | | 2/2003 | Fujimori et al. |
| 6,529,015 B2 | * | 3/2003 | Nonoyama et al. ..... 324/678 |
| 7,015,852 B1 | | 3/2006 | Atris et al. |
| 7,023,372 B1 | * | 4/2006 | Singh et al. ............ 341/155 |
| 7,235,983 B2 | | 6/2007 | O'Dowd et al. |
| 7,265,706 B2 | * | 9/2007 | Boemler ................. 341/163 |
| 7,271,758 B2 | * | 9/2007 | Piasecki et al. .......... 341/172 |
| 7,282,929 B2 | | 10/2007 | Atris et al. |
| 7,289,502 B1 | | 10/2007 | Gemelli et al. |
| 7,304,483 B2 | * | 12/2007 | O'Dowd et al. ......... 324/658 |
| 7,411,538 B1 | * | 8/2008 | Piasecki ................. 341/161 |
| 7,595,648 B2 | * | 9/2009 | Ungaretti et al. ........ 324/678 |
| 2002/0148291 A1 | * | 10/2002 | Nagahara et al. ........ 73/514.32 |

(Continued)

FOREIGN PATENT DOCUMENTS

DE  4119244 A1 * 12/1992

(Continued)

OTHER PUBLICATIONS

Lotters, J., et al., A sensitive differential capacitance to voltage converter for sensor applications, Instrumentation and Measurement, IEEE Transactions on vol. 48, Issue 1, Feb. 1999 pp., 89-96.

(Continued)

*Primary Examiner* — Timothy J Dole
*Assistant Examiner* — Benjamin M Baldridge
(74) *Attorney, Agent, or Firm* — Ingrassia Fisher & Lorenz, P.C.

(57) ABSTRACT

A capacitance-to-voltage interface circuit includes a capacitive sensing circuit, an amplification circuit adapted for selective coupling to the capacitive sensing circuit, a capacitor bank comprising a plurality of binary-weighted capacitors, and a switching architecture associated with the capacitive sensing circuit, the amplification circuit, and the capacitor bank. The switching architecture reconfigures the capacitance-to-voltage interface circuit for operation in a plurality of different phases, including an amplification phase and an analog-to-digital conversion phase. During the amplification phase, the capacitor bank is utilized for offsetting capacitance of the amplification circuit. During the analog-to-digital conversion phase, the capacitor bank is utilized in a successive approximation register.

19 Claims, 9 Drawing Sheets

U.S. PATENT DOCUMENTS

| | | |
|---|---|---|
| 2003/0234736 A1 | 12/2003 | Tachibana et al. |
| 2005/0140537 A1 | 6/2005 | Waltari |
| 2006/0068749 A1 | 3/2006 | Ismail et al. |
| 2006/0114074 A1* | 6/2006 | Matsui et al. ............. 331/177 V |
| 2006/0273804 A1 | 12/2006 | Delorme et al. |
| 2008/0211706 A1 | 9/2008 | Sutardja |
| 2010/0001892 A1 | 1/2010 | Aruga et al. |

FOREIGN PATENT DOCUMENTS

| | | |
|---|---|---|
| JP | 11-023609 A | 1/1999 |

OTHER PUBLICATIONS

Craninckx, J., et al., A 65fJ/Conversion-Step 0-to-50MS/s 0-to-0.7mW 9b Charge-Sharing SAR ADC in 90nm Digital CMOS, ISSCC 2007, Session 13, Feb. 2007, pp. 246-247; 600.

Agnes, A, et al., A 9.4ENOB 1V 3.8 uW 100sK/s SAR ADC with time domain comparator, IEEE International Solid State Circuits Conference, pp. 246-247, 2008.

Notice of Allowance mailed Jun. 1, 2010 on U.S. Appl. No. 12/360,933.

* cited by examiner

CAPACITANCE-TO-VOLTAGE INTERFACE CIRCUIT WITH SHARED CAPACITOR BANK FOR OFFSETTING AND ANALOG-TO-DIGITAL CONVERSION

RELATED APPLICATIONS

The subject matter described here is related to that described in U.S. patent application Ser. No. 12/360,932, filed concurrently herewith, and to that described in U.S. patent application Ser. No. 12/360,933, filed concurrently herewith. The entire content of these related applications is incorporated by reference herein.

TECHNICAL FIELD

Embodiments of the subject matter described herein relate generally to electronic circuits. More particularly, embodiments of the subject matter relate to a sensor interface circuit that converts measured changes in capacitance into a digital expression.

BACKGROUND

The prior art is replete with electronic sensors, transducers, and circuits that detect or measure physical phenomena. For example, an accelerometer can be realized as a miniature sensor component that detects movement, changes in physical orientation, vibration, shaking, or the like. Miniature accelerometers can be included in a variety of applications such as mobile devices, portable video games, and digital media players. An accelerometer in such a device can be used to detect whether the display of the device is oriented in a portrait mode or a landscape mode, to transition between sleep and active modes, to obtain user input (e.g., shaking the device might represent a user command), etc.

Accelerometers in portable devices are often implemented with capacitive sensing cells. In this context, a capacitive sensing cell includes a plurality of capacitors that are arranged and energized such that the capacitance of the cell varies with its acceleration. In typical applications, the measured difference in capacitance is converted into a voltage that can be processed or analyzed in an appropriate manner. In particular, a capacitance-to-voltage interface circuit can be used to convert the measured capacitance differential into a corresponding analog voltage. However, due to the relatively low voltage levels associated with such capacitance-to-voltage conversion, the analog voltage is usually amplified to provide adequate dynamic range for purposes of subsequent analog-to-digital conversion.

Conventional capacitance-to-voltage interface circuits utilize a capacitive sensing cell and an amplifier stage (which may include one or more operational amplifiers) associated with the capacitance-to-voltage conversion and analog voltage amplification. In practice, a bank of selectable capacitors might be used to provide a desired offset voltage for the amplifier stage—the offset voltage is used to compensate for manufacturing variation and device tolerances to ensure proper operation of the interface circuit. Successive approximation register (SAR) based analog-to-digital converters (ADCs) also utilize a bank of capacitors that are used to determine the bit values corresponding to the analog voltage input.

Unfortunately, the offset capacitors and the SAR capacitors consume a significant amount of the physical space associated with such a capacitance-to-voltage interface circuit. Although a conventional implementation might function in an acceptable manner, the use of two or more distinct and separate capacitor banks is undesirable from both a physical packaging standpoint and a power consumption standpoint. In this regard, it is usually desirable to decrease the integrated circuit die area and, consequently, the overall physical footprint of mobile devices. In addition, it is usually desirable to decrease the electrical current requirements and, therefore, increase the battery life of mobile devices. Accordingly, it is desirable to reduce the physical size and power consumption of capacitance-to-voltage interface circuits.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
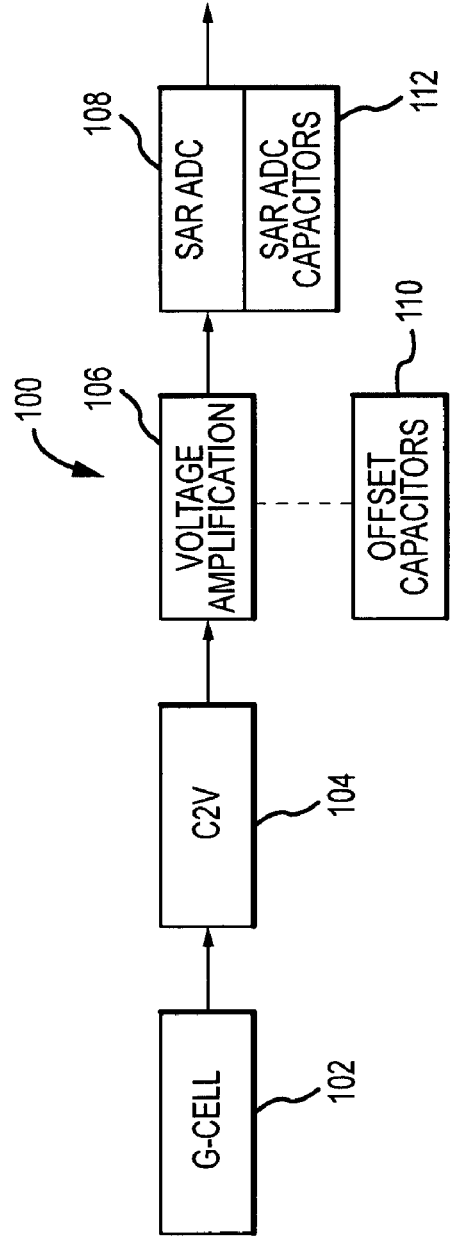
FIG. 1 is a simplified schematic representation of a capacitance-to-voltage interface circuit having two distinct and different capacitor banks.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures depict exemplary arrangements of elements, additional intervening elements, devices, features, or components may be present in an embodiment of the depicted subject matter.

The techniques and technologies described herein can be utilized with a capacitive sensing cell of the type commonly found in electronic sensors such as accelerometers. More specifically, the subject matter described herein relates to a reconfigurable capacitance-to-voltage interface circuit that leverages a single bank of capacitors for dual purposes: providing offset voltage to an amplifier stage, and for SAR operation. The use of a shared capacitor bank rather than two physically distinct and separate capacitor banks in this context is desirable to reduce packaging size and to reduce power consumption of the host device or system.

The exemplary embodiments described herein relate to a charge redistribution SAR ADC circuit, which can be deployed in a wide variety of applications where it is desirable to convert an analog voltage into a digital representation. In such applications, the analog voltage is ordinarily within a certain range, and the digital output is generated using a predetermined number of bits. For example, certain practical embodiments of the subject matter described here contemplate an analog voltage input in the range of 0.0 to 2.2 volts, and the analog voltage input is converted into a digital representation having four to eight bits. Of course, the actual analog voltage range and the number of output bits may vary to suit the needs of the particular application.

FIG. 1 is a simplified schematic representation of a capacitance-to-voltage interface circuit 100 that includes a capacitive sensing cell 102 (also known as a g-cell), a capacitance-to-voltage conversion circuit 104, a voltage amplification circuit 106, and an SAR ADC 108. Circuit 100 may also include a switching architecture (not shown) that allows circuit 100 to assume different topologies and configurations during operation. In some embodiments, capacitive sensing cell 102 is implemented as a distinct device or package, while the remainder of circuit 100 is implemented as an application specific integrated circuit (ASIC), which is coupled to capacitive sensing cell 102. For the sake of brevity, conventional techniques related to capacitive sensing, integrated circuit design, amplifier design and operation, and other functional aspects of the circuits (and the individual operating elements of the circuits) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the interface circuit.

Capacitive sensing cell 102 is suitably configured such that its capacitance is a function of its acceleration, motion, and/or physical orientation. As described in more detail below, capacitive sensing cell 102 may be of conventional design, and it may include two capacitors in series. The switching architecture is utilized to selectively couple capacitive sensing cell 102 to capacitance-to-voltage conversion circuit 104 as needed and to rearrange, reconfigure, and/or establish different topologies for circuit 100 (explained in more detail below).

Capacitance-to-voltage conversion circuit 104 performs capacitance-to-voltage conversion operations, and its voltage output is amplified by voltage amplification circuit 106. The output of voltage amplification circuit 106 will be indicative of the acceleration, movement, shaking, physical orientation, or vibration of the host device. The amplified output voltage is provided to SAR ADC 108, which then converts the amplified output voltage into an equivalent digital representation. Operation of SAR ADC 108 may follow well known principles, and the design, configuration, and function of SAR ADC 108 will not be described in detail here. The bit resolution of SAR ADC 108 can be chosen to suit the needs of the particular application.

Circuit 100 includes a bank of offset capacitors 110 and a physically distinct and separate bank of SAR ADC capacitors 112. The SAR ADC capacitors 112 may be considered to be a part of SAR ADC 108 itself, as depicted in FIG. 1. The bank of offset capacitors 110 are selectively connected to voltage amplification circuit 106 at appropriate times to provide offset voltage to circuit 100. The dashed line in FIG. 1 represents this selective and switchable nature of offset capacitors 110. Notably, the use of two separate, different, and distinct banks of capacitors in circuit 100 requires a significant amount of physical space, relative to the total overall space needed for circuit 100.

Figure 2:
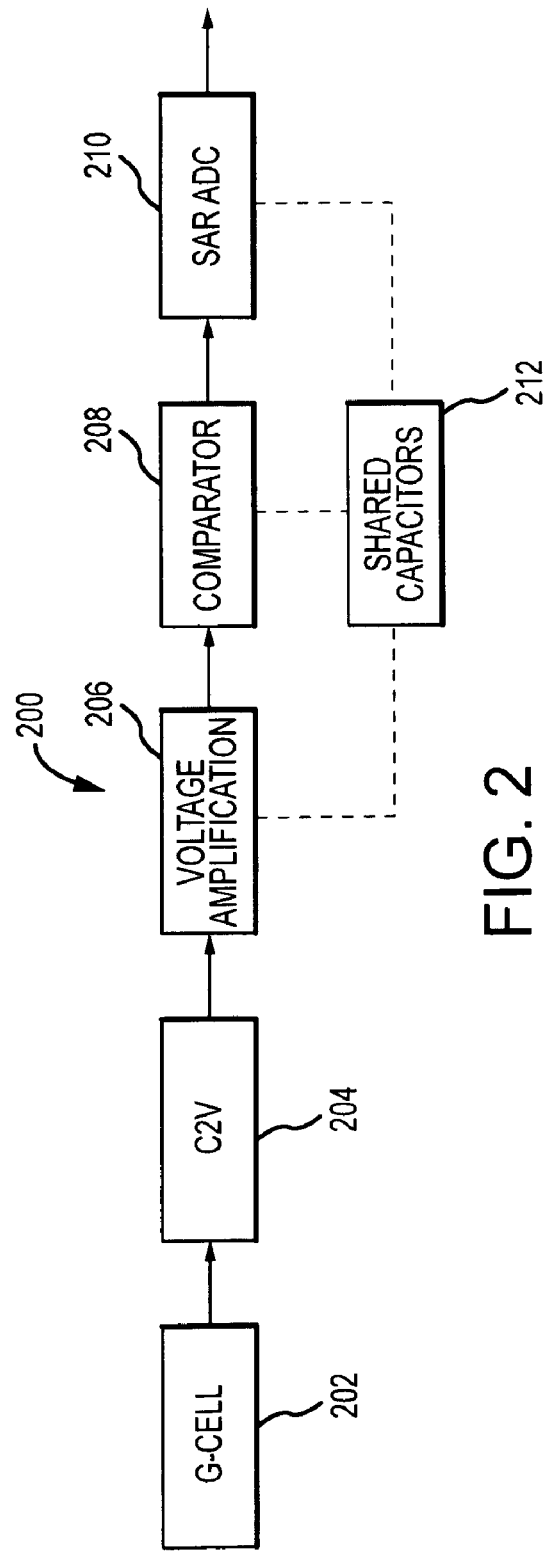
FIG. 2 is a simplified schematic representation of an embodiment of a capacitance-to-voltage interface circuit that employs a shared capacitor bank.

In contrast to that depicted in FIG. 1, the capacitance-to-voltage interface circuit 200 shown in FIG. 2 employs a shared capacitor bank. This embodiment of circuit 200 generally includes, without limitation: a capacitive sensing cell 202, a capacitance-to-voltage conversion circuit 204, a voltage amplification circuit 206, a comparator circuit 208, an SAR ADC 210, and a bank of shared capacitors 212. Capacitive sensing cell 202, capacitance-to-voltage conversion circuit 204, voltage amplification circuit 206, and SAR ADC 210 may be similar to that used in circuit 100. Comparator circuit 208 is utilized during SAR ADC operations, as described in more detail below.

Notably, the bank of shared capacitors 212 is selectively utilized for purposes of voltage offsetting and SAR ADC operation. The dashed lines in FIG. 2 represent this selective and switchable nature of shared capacitors 212. In this regard, circuit 200 preferably includes a switching architecture (not shown) that is associated with at least some of the elements of circuit 200—the switching architecture determines and influences the particular circuit topology and configuration of circuit elements in circuit 200 at any given time. The switching architecture may be realized using any number of controllable switches or switching elements (which might be distributed throughout circuit 200), such as transistor-based switches implemented in any appropriate configuration. The state, mode, or condition of each switch in the switching architecture is preferably controlled with suitable processor control logic (not shown). In this manner, a processor of the host device can be suitably programmed to control the switching architecture as needed to support the various operations described here. In practice, one or more switches may be integrated with or coupled to capacitive sensing cell 202, a number of switches may reside "between" capacitive sensing cell 202 and capacitance-to-voltage conversion circuit 204, one or more other switches may be integrated with or coupled to capacitance-to-voltage conversion circuit 204, and still other switches may reside "between" capacitance-to-voltage conversion circuit 204 and SAR ADC 210. For simplicity and clarity, individual switching elements are neither illustrated nor described in detail with reference to FIG. 2.

Figure 3:
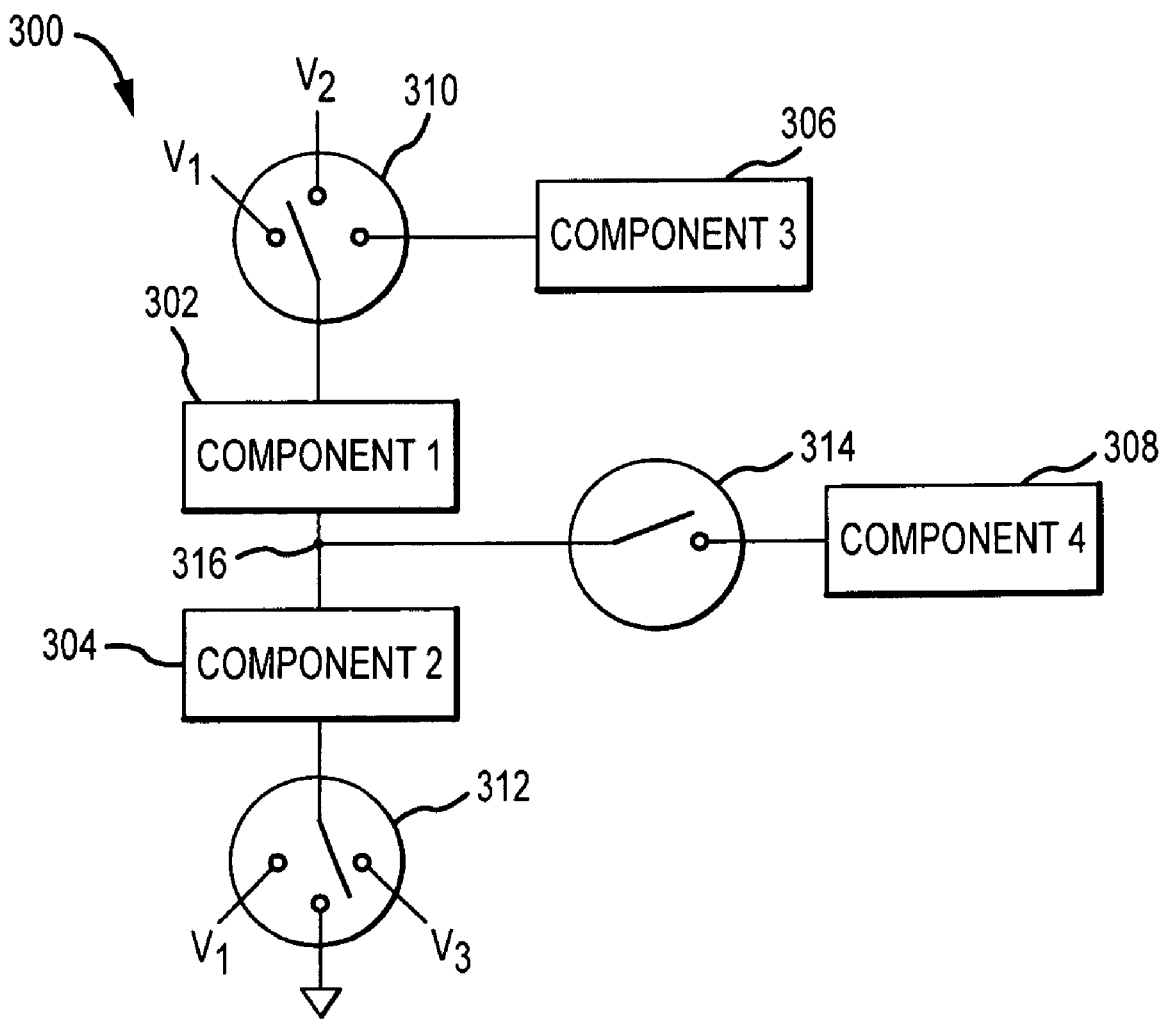
FIG. 3 is a diagram that illustrates electrical components that can be arranged and reconfigured into different circuit topologies using a switching architecture.

The manner in which a switching architecture might operate with circuit 200 will be described with reference to FIG. 3, which is a diagram that illustrates electrical components 300 that can be arranged and reconfigured into different circuit topologies using a switching architecture. FIG. 3 depicts four electrical components 302, 304, 306, and 308, and three switches 310, 312, and 314. For this implementation, the switching architecture includes at least the three switches 310, 312, and 314. Switch 310 can be controlled to connect component 302 to either a first voltage level ($V_1$), a second voltage level ($V_2$), or component 306. Switch 312 can be controlled to connect component 304 to either $V_1$, analog ground, or a third voltage level ($V_3$). Components 302 and 304 are connected together at a shared node 316. Depending upon the state of switch 314, shared node 316 is connected or disconnected from component 308.

Depending upon the particular state of switches 310, 312, and 314, the electrical components 300 will form different circuit topologies and configurations. In a more complex implementation, the switching architecture can establish alternative conductive paths between components, connect/disconnect elements and components from each other, and/or alter the combined functionality of capacitors, resistors, operational amplifiers, and/or other electrical components. Accordingly, referring back to FIG. 2, a switching architecture may include any number of individual switching elements that cooperate with various electrical components and electrical conductors of capacitive sensing cell 202, capacitance-to-voltage conversion circuit 204, voltage amplification circuit 206, comparator circuit 208, and/or SAR ADC 210 to rearrange and reconfigure circuit 200 into different topologies that support different modes of operation or functional phases. For example, as explained in more detail below, the switching architecture is preferably controlled such that circuit 200 can be operated in a reset phase, in at least one capacitance-to-voltage (C2V) phase, and at least one amplification phase. In addition, the architecture can be controlled to enable circuit 200 to operate in an analog-to-digital conversion phase.

Figure 4:
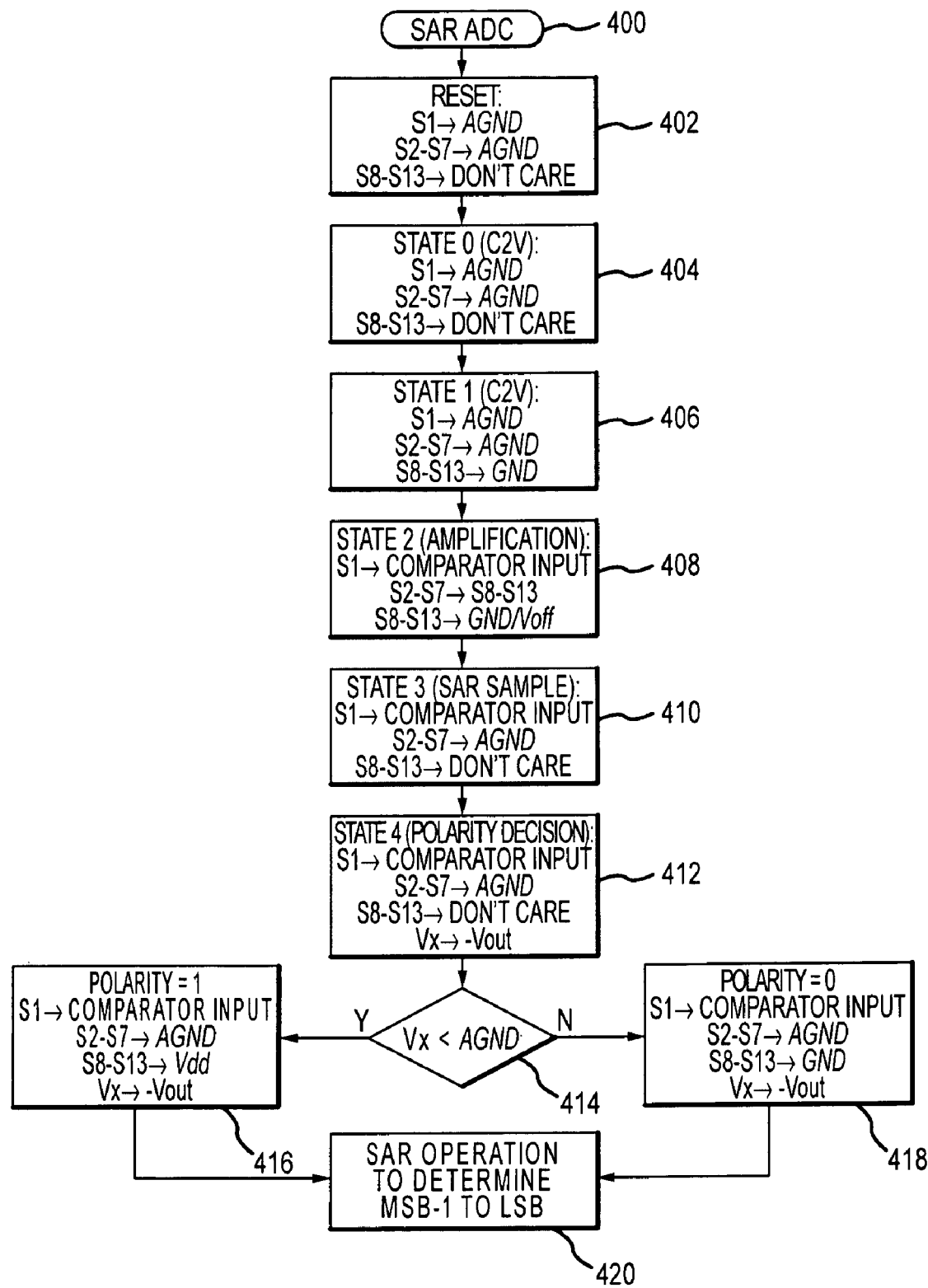
FIG. 4 is a flow chart that illustrates an exemplary embodiment of an SAR ADC process, which may be carried out by the circuit depicted in FIGS. 5-10.
Figure 5:
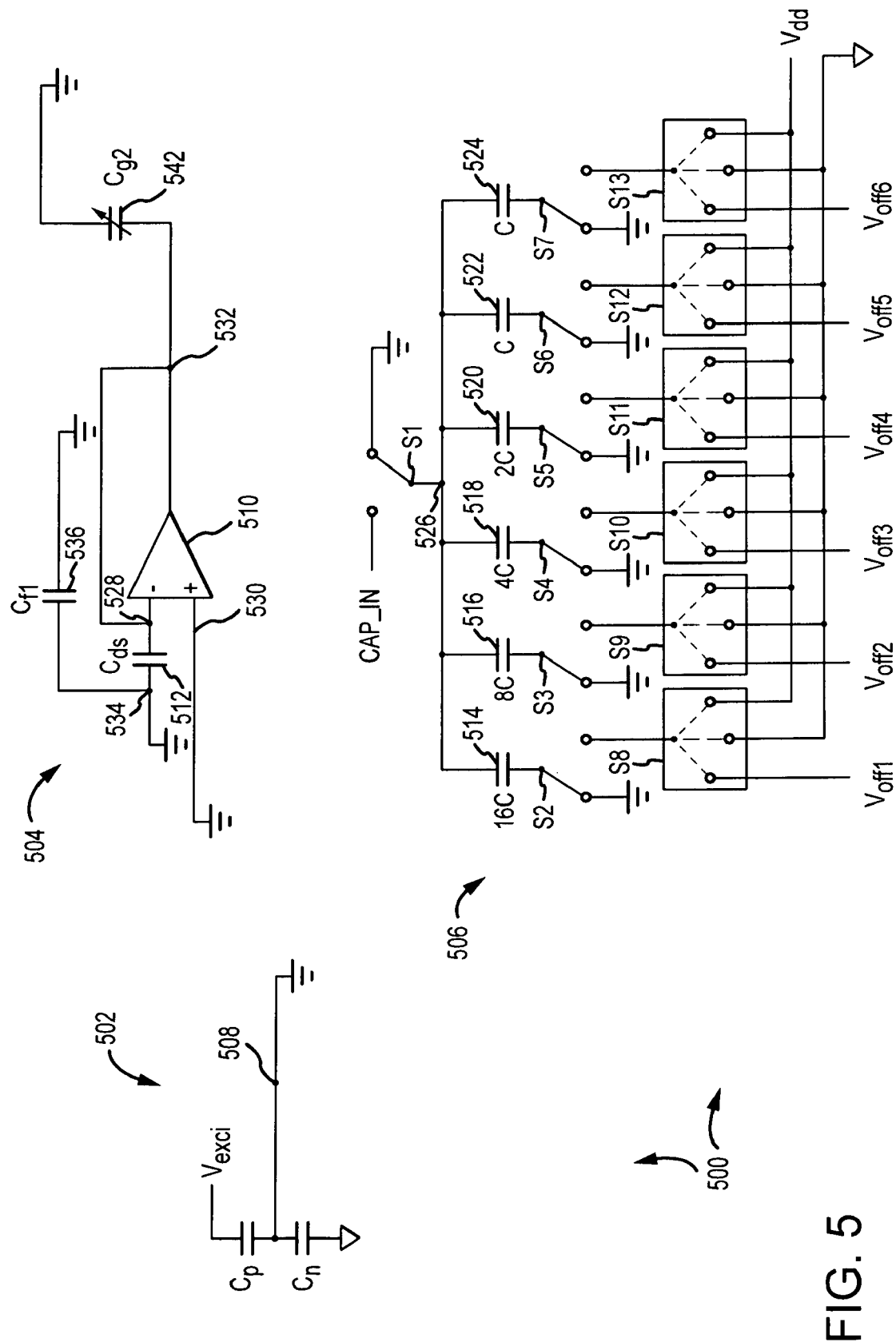
FIG. 5 is a circuit diagram that illustrates an embodiment of a capacitance-to-voltage interface circuit arranged in a reset topology and configuration.

FIG. 4 is a flow chart that illustrates an exemplary embodiment of an SAR ADC process 400, which may be carried out by a suitably configured capacitance-to-voltage interface circuit (such as circuit 200). In practice, portions of process 400 may be performed by different elements of the described system, e.g., a switching architecture, one or more switches, an amplifier circuit, an ADC circuit, or the like. Accordingly, for ease of description, process 400 refers to the operation of the capacitance-to-voltage interface circuit 500 depicted in FIGS. 5-10, where FIG. 5 is a circuit diagram that illustrates circuit 500 arranged in a reset topology and configuration, and FIGS. 6-10 are circuit diagrams that illustrate circuit 500 as arranged in different topologies and configurations corresponding to different operational stages or phases. It should be appreciated that the various tasks performed in connection with process 400 may be performed by software, hardware, firmware, or any combination thereof. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Referring to FIG. 5, circuit 500 generally includes a capacitive sensing circuit 502, a capacitance-to-voltage and amplification (C2V/AMP) circuit 504, and a shared capacitor bank 506. Notably, a suitably controlled switching architecture reconfigures circuit 500 for operation in a plurality of different phases and modes, such that shared capacitor bank 506 is used for voltage offsetting and for SAR operation, as explained in more detail below. Although the actual circuit topology and configuration is altered during operation of circuit 500, the primary circuit elements and components listed above are utilized throughout the different operating phases. Moreover, the various elements and components of circuit 500 are coupled together as needed to support the different operating modes described in more detail below. For the sake of brevity, conventional techniques related to analog-to-digital conversion, SAR, switch control, and other functional aspects of the circuits (and the individual operating components of the circuits) may not be described in detail herein.

This embodiment of capacitive sensing circuit 502 includes one sensing cell that has a first sensing capacitor (labeled Cp) coupled in series with a second sensing capacitor (labeled Cn). The sensing cell includes a first sensor voltage node associated with its Cp sensing capacitor, and a second sensor voltage node associated with its Cn sensing capacitor. In accordance with known principles, the capacitance of Cp and Cn will be influenced by acceleration, motion, or positioning of capacitive sensing circuit 502 and, consequently, the host device. The two sensing capacitors are in series, i.e., one of the conductors of the first sensing capacitor and one of the conductors of the second sensing capacitor are coupled to and share a common node. The output of the capacitive sensing cell is taken from its common node. In this embodiment, the common node forms an output node 508 for capacitive sensing circuit 502.

C2V/AMP circuit 504 is based on (and includes) at least one operational amplifier 510. C2V/AMP circuit 504 also includes an offset capacitor 512 (labeled Cds) and a number of load and feedback capacitors that are selectively arranged as needed to support operation in the different phases described herein. In practice, operational amplifier 510 is connected to an upper reference voltage, e.g., a supply voltage (Vdd), and to a lower reference voltage, e.g., ground (zero volts); Vdd also has significance during analog-to-digital conversion, as explained below.

The illustrated embodiment of shared capacitor bank 506 includes, without limitation: an input switch S1, a plurality of binary-weighted capacitors (reference numbers 514, 516, 518, 520, 522, 524), a plurality of capacitor switches (individually labeled S2-S7), and a plurality of reference switches (individually labeled S8-S13). Although not depicted in the figures, circuit 500 will include suitable switch control logic (which may be implemented or performed by an appropriate processor element) that determines and sets the desired states of input switch S1, capacitor switches S2-S7, and reference switches S8-S13. An embodiment of circuit 500 need not use the switching architecture and switch arrangement depicted in the figures, and alternative implementations can be employed as long as the necessary connections and disconnections are established at the appropriate time. In other words, the particular manner in which the switches in circuit 500 are realized may vary from one embodiment to another.

In preferred embodiments, circuit 500 generates an N-bit digital output and a single polarity bit from the analog input voltage, and shared capacitor bank 506 consists of N binary-weighted capacitors and one balancing capacitor. The illustrated embodiment includes six capacitors, which correspond to a five-bit digital output (capacitor 524 represents a balancing capacitor). Each of these capacitors has one of its conductors (the top conductor shown in FIG. 5) coupled to the common terminal of input switch S1. This shared node is referred to herein as the common capacitor node 526. The other conductor (the bottom conductor shown in FIG. 5) is coupled to one of the plurality of capacitor switches S2-S7. In particular, capacitor 514 is coupled between input switch S1 and capacitor switch S2, capacitor 516 is coupled between input switch S1 and capacitor switch S3, capacitor 518 is coupled between input switch S1 and capacitor switch S4, capacitor 520 is coupled between input switch S1 and capacitor switch S5, capacitor 522 is coupled between input switch S1 and capacitor switch S6, and capacitor 524 is coupled between input switch S1 and capacitor switch S7.

The capacitance of each capacitor in shared capacitor bank 506 is based upon a unit capacitance (C for circuit 500. As depicted in FIG. 5, capacitor 522 has the unit capacitance, as does capacitor 524. The capacitance of capacitor 520 is two times the unit capacitance, the capacitance of capacitor 518 is four times the unit capacitance, the capacitance of capacitor 516 is eight times the unit capacitance, and the capacitance of capacitor 514 is sixteen times the unit capacitance. The value of C will depend on the mismatch characteristics and the desired resolution specification. Of course, the actual value of C may also depend upon the analog voltage levels, the number of output bits, the particular application, and other practical considerations and factors. In one implementation, the value of C is 250 fF.

Input switch S1 may be realized as a single pole double throw switch having its common terminal coupled to common capacitor node 526, as shown in FIG. 5. A first selectable terminal of input switch S1 (labeled CAP_IN) is coupled to C2V/AMP circuit 504 as needed, and a second selectable terminal is coupled to an analog reference voltage (Vref). This allows input switch S1 to selectively couple shared capacitor bank 506 to either the CAP_IN node or Vref as needed. Notably, for this particular embodiment, Vref corresponds to analog ground (AGND) and the voltage sampled at the CAP_IN node represents the analog voltage (Vin) that is converted into digital form by circuit 500. For this example, Vin has a voltage range between zero volts and Vdd. Moreover, AGND is defined as the midpoint of this voltage range, i.e., $$AGND = Vref = \frac{Vdd}{2}.$$

Therefore, in an alternate embodiment where $V_{IN}$ has a voltage range of negative $$\frac{Vdd}{2}$$

to positive $$\frac{Vdd}{2},$$

AGND is defined to be zero volts.

For clarity and simplicity, the figures utilize an inverted triangle to indicate zero volts (also referred to here as ground or GND), and utilize three bars to indicate analog ground (also referred to here as Vref or AGND). This description may refer to these different voltages using the equivalent expressions.

Each capacitor switch S2-S7 may be realized as a single pole double throw switch having its common terminal coupled to the bottom conductor of its respective capacitor. In the illustrated embodiment, switch S2 is connected to the bottom conductor of capacitor 514, switch S3 is connected to the bottom conductor of capacitor 516, switch S4 is connected to the bottom conductor of capacitor 518, switch S5 is connected to the bottom conductor of capacitor 520, switch S6 is connected to the bottom conductor of capacitor 522, and switch S7 is connected to the bottom conductor of capacitor 524. One selectable terminal of each capacitor switch S2-S7 is coupled to analog ground, while the other selectable terminal of each capacitor switch S2-S7 is coupled to the common terminal of a respective reference switch S8-S13.

Each reference switch S8-S13 may be realized as a single pole triple throw switch having its common terminal coupled to one of the capacitor switches S2-S7. More particularly, capacitor switch S2 has one of its selectable terminals coupled to the common terminal of reference switch S8, capacitor switch S3 has one of its selectable terminals coupled to the common terminal of reference switch S9, capacitor switch S4 has one of its selectable terminals coupled to the common terminal of reference switch S10, capacitor switch S5 has one of its selectable terminals coupled to the common terminal of reference switch S11, capacitor switch S6 has one of its selectable terminals coupled to the common terminal of reference switch S12, and capacitor switch S7 has one of its selectable terminals coupled to the common terminal of reference switch S13. Each reference switch S8-S13 has one of its selectable terminals coupled to a lower reference voltage such as ground (zero volts), and a different one of its selectable terminals coupled to an upper reference voltage such as Vdd. Notably, the third selectable terminal of each reference switch S8-S13 is coupled to a respective offset voltage, which is utilized during an amplification stage/phase of circuit 500 (explained below). These offset voltages are labeled Voff1-Voff6, and each offset voltage may be different.

Input switch S1, capacitor switches S2-S8, and reference switches S8-S13 are independently actuated under the control of suitable switching logic (not shown). The topology of circuit 500 at any given moment will therefore change depending upon the states of these switches. As described in more detail below, these switches are suitably controlled and arranged as needed to accommodate operation of circuit 500 in various modes during analog-to-digital conversion of the sampled voltage.

Referring again to FIG. 4, process 400 is performed in an iterative manner to obtain a voltage from capacitive sensing circuit 502, amplify that voltage, and convert the amplified analog voltage into a digital representation. In certain embodiments, process 400 can be iteratively performed in a substantially continuous manner or as often as needed. The illustrated embodiment of process 400 begins by arranging the elements of circuit 500 into a predetermined reset topology and configuration (task 402). During the reset phase, circuit 500 is initialized and otherwise prepared for the next capacitance-to-voltage operation. FIG. 5 illustrates circuit 500 arranged in one exemplary topology suitable for operation during a reset phase.

As depicted in FIG. 5, capacitive sensing circuit 502 is reset by: disconnecting node 508 from C2V/AMP circuit 504, applying an excitation voltage (labeled Vexci) to the first sensor voltage node, applying analog ground to node 508, and applying zero volts to the second sensor voltage node. In alternate embodiments, Vexci is applied to the second sensor voltage node, while the first sensor voltage node is held at zero volts. The disconnection of node 508 from C2V/AMP circuit 504 effectively isolates capacitive sensing circuit 502 from the other elements of circuit 500. In preferred embodiments, Vexci is twice the analog ground voltage, which results in equal charging of the two sensing capacitors of the capacitive sensing cell. Although Vexci may be more or less than twice the analog ground voltage, the double voltage is preferred to avoid electrostatic effects, oscillations, offset capacitor voltage, and capacitor noise. In certain embodiments, Vexci is about 3.6 volts, and analog ground is about 1.8 volts.

Referring to C2V/AMP circuit 504, operational amplifier 510 includes an inverting input node 528, a noninverting input node 530, and an output node 532. Noninverting input node 530 receives analog ground, as shown in FIGS. 5-10. Offset capacitor 512 is coupled between inverting input node 528 and a feedback node 534, as shown in FIGS. 5-10. As is well known, offset capacitor 512 is used for double sampling purposes to reduce offset voltage associated with operational amplifier 510. During the reset phase, inverting input node 528 is connected to output node 532, thus causing operational amplifier 510 to function as a voltage follower.

During the reset phase depicted in FIG. 5, a feedback capacitor 536 is connected between feedback node 534 and analog ground. In other words, one conductor of feedback capacitor 536 is coupled to feedback node 534, while analog ground is applied to the other conductor. Notably, analog ground is also applied to feedback node 534. Thus, during the reset phase, analog ground is applied across feedback capacitor 536 to reset it. As shown in FIG. 5, the reset topology of C2V/AMP circuit 504 also includes a load capacitance 542, which is connected between output node 532 and analog ground during the reset phase.

The reset topology of FIG. 5 resets feedback capacitor 536 and load capacitance 542 to their respective initial voltages (zero volts in this example). In addition, the reset topology resets or otherwise initializes operational amplifier 510. During the reset phase, the output of operational amplifier 510 will be its offset voltage, and this offset voltage will be applied to the bottom conductor of load capacitance 542. Analog ground is applied to the top conductor of load capacitance 542, resulting in initial charging of load capacitance 542. This topology also results in the charging of offset capacitor 512 to the offset voltage corresponding to operational amplifier 510. This occurs because the reset topology causes the voltage at the inverting input node 528 to be equal to analog ground plus or minus the actual offset voltage of operational amplifier 510. Since analog ground is applied at feedback node 534, offset capacitor 512 will be charged to the particular offset voltage of operational amplifier 510.

Resetting of shared capacitor bank 506 is performed to remove the charge across the capacitors or to otherwise initialize the voltage across the capacitors. In this regard, FIG. 5 depicts shared capacitor bank 506 as arranged for operation in the reset mode. For this reset topology, input switch S1 is set such that it connects analog ground to its common terminal, each of the capacitor switches S2-S7 is set such that it connects analog ground to its respective common terminal, and the reference switches S8-S13 can be set to any arbitrary position (because their common terminals are left floating and, therefore, they are disconnected from the capacitors). Notably, input switch S1 is set such that it effectively disconnects and isolates shared capacitor bank 506 from the remainder of circuit 500. In this arrangement, analog ground is connected across each capacitor in shared capacitor bank 506, thus removing any charge from those capacitors. In other words, each capacitor in shared capacitor bank 506 is reset or "zeroed" to prepare circuit 500 for voltage sampling.

Figure 6:
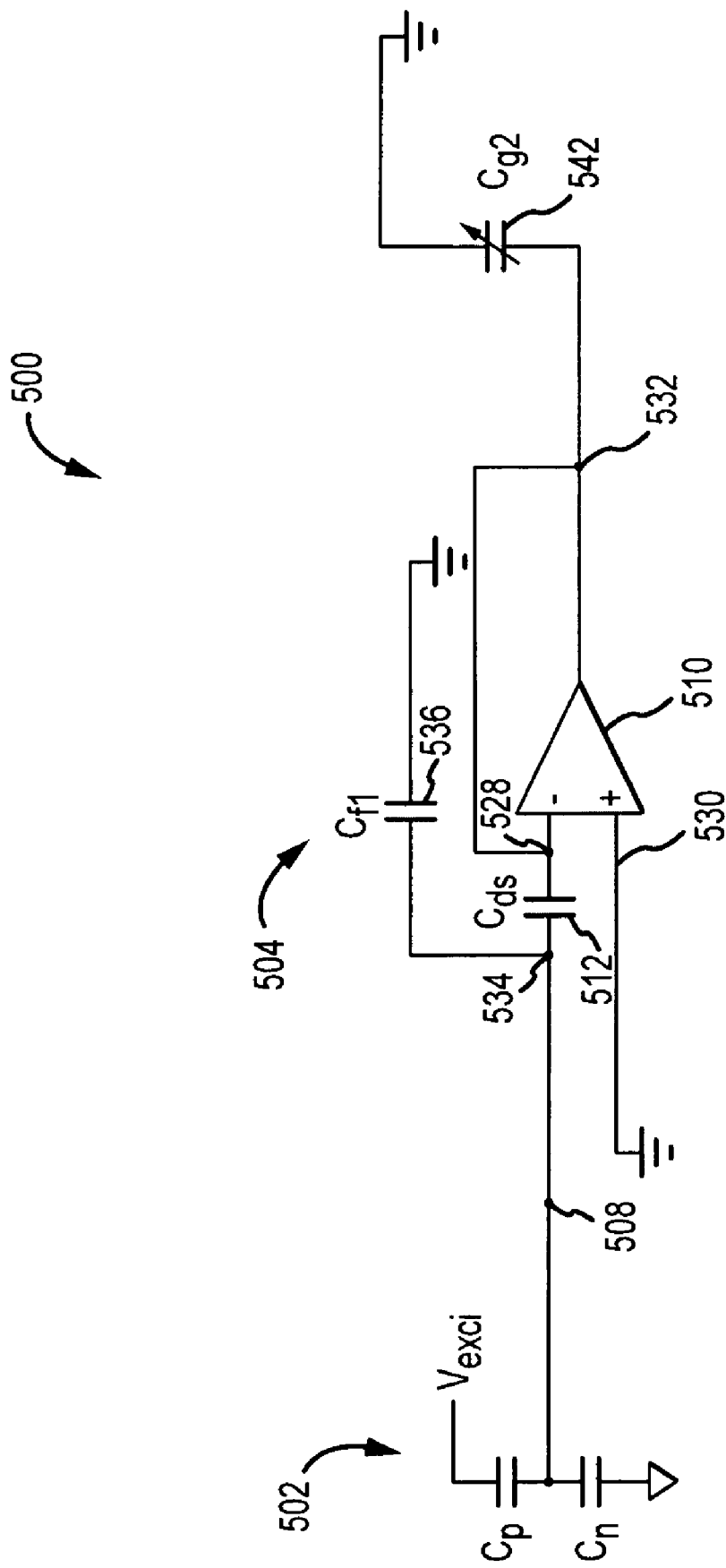
FIGS. 6-10 are circuit diagrams that illustrate the circuit depicted in FIG. 5, as arranged in different topologies and configurations at different operational stages.

Circuit 500 preferably remains in the reset mode for a sufficient amount of time to allow it to be reset/initialized. In other words, while the reset configuration is enabled, the capacitors in shared capacitor bank 506 are zeroed and the capacitors in C2V/AMP circuit 504 are initialized. Thereafter, process 400 continues by arranging the elements of circuit 500 into a state or topology that corresponds to an initial C2V state or phase (task 404). During this phase (referred to here as Phase Zero or State Zero), circuit 500 is prepared for the conversion of a measured difference in capacitance of sensing circuit 502 into a measured voltage. In this regard, FIG. 6 depicts a portion of circuit 500, arranged for operation in during Phase Zero.

For Phase Zero, circuit 500 is rearranged by connecting node 508 of capacitive sensing circuit 502 to feedback node 534. Thereafter, analog ground is applied to node 508 and to feedback node 534 (which now correspond to each other, as shown in FIG. 6). The other circuit element couplings and applied voltages of capacitive sensing circuit 502 and C2V/AMP circuit 504 are as described previously for the reset phase. It should be appreciated that connecting capacitive sensing circuit 502 to feedback node 534 in this manner is necessary to obtain a measurement from capacitive sensing circuit 502. During Phase Zero, the voltage at output node 532 will be $V_{OUT0}=V_{OFF}+V_{REF}$, where $V_{OFF}$ (which may be positive or negative) is the offset voltage of operational amplifier 510. For Phase Zero, shared capacitor bank 506 remains disconnected and isolated from C2V/AMP circuit 504, and it remains in the reset topology and arrangement described above with reference to FIG. 5. For this reason, shared capacitor bank 506 is not illustrated in FIG. 6.

Figure 7:
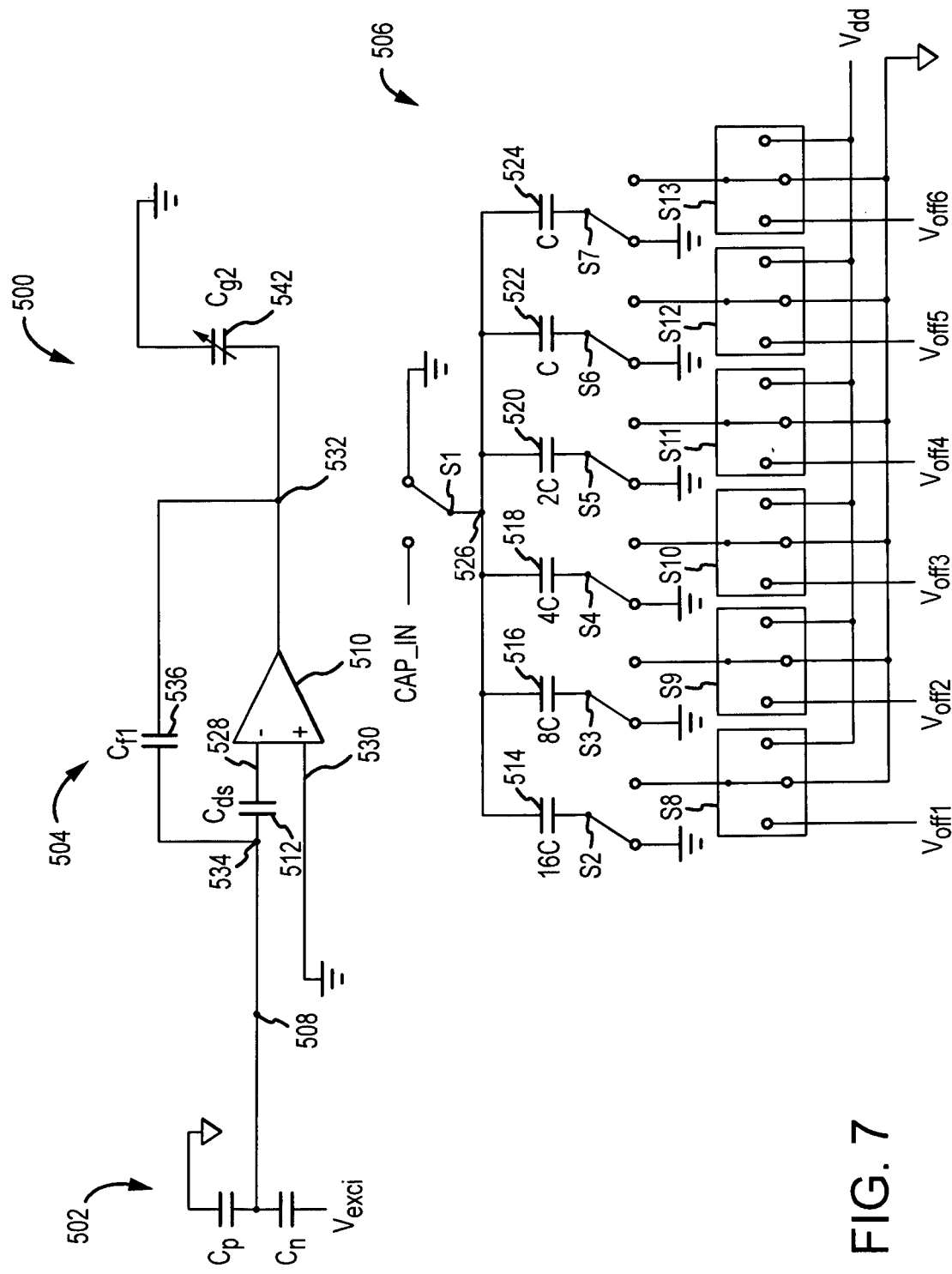

Referring again to FIG. 4, circuit 500 preferably remains in Phase Zero for a sufficient amount of time before transitioning to the next phase. In this regard, process 400 continues by arranging the elements of circuit 500 into a final C2V topology and configuration (task 406). This final C2V phase is referred to here as Phase One or State One. FIG. 7 is a circuit diagram that illustrates circuit 500 arranged for operation during Phase One. During this final C2V phase, circuit 500 obtains a measured voltage that is indicative of the measured difference or change in capacitance experienced by capacitive sensing circuit 502.

For Phase One, circuit 500 is rearranged in a number of different ways. For instance, the polarity of the capacitive sensing cell is reversed by applying zero volts at its first sensor voltage node (in lieu of Vexci) and by applying Vexci to its second sensor voltage node (in lieu of zero volts). Moreover, analog ground is removed from node 508 and from feedback node 534. This topology allows C2V/AMP circuit 504 to obtain the capacitance measure from capacitive sensing circuit 502. In addition, this topology enables operational amplifier 510 to function as an integrator with load capacitance 542 acting as the load. In this regard, feedback capacitor 536 is inserted into the feedback path of operational amplifier 510. This Phase One topology produces the measured voltage at output node 532.

As shown in FIG. 7, operational amplifier 510 is no longer arranged in a voltage follower configuration. Rather, for the final C2V phase, inverting input node 528 is disconnected from output node 532. Moreover, analog ground is removed from the conductor of feedback capacitor 536, and that conductor is connected to output node 532. Thus, feedback capacitor 536 is coupled between feedback node 534 and output node 532 during Phase One. The configuration and arrangement of load capacitance 542 remains as described above for the previous phase.

During Phase One, each capacitor switch S2-S7 remains in its previous state such that its common terminal is connected to analog ground. Although FIG. 7 depicts each of the reference switches S8-S13 set such that its common terminal is coupled to ground, i.e., zero volts, the actual state of switches S8-S13 can be arbitrarily set because those switches remain floating during Phase One. Input switch S1 remains connected to analog ground, which keeps shared capacitor bank 506 isolated from the remainder of circuit 500. This topology prepares shared capacitor bank 506 for the next stage.

Figure 8:
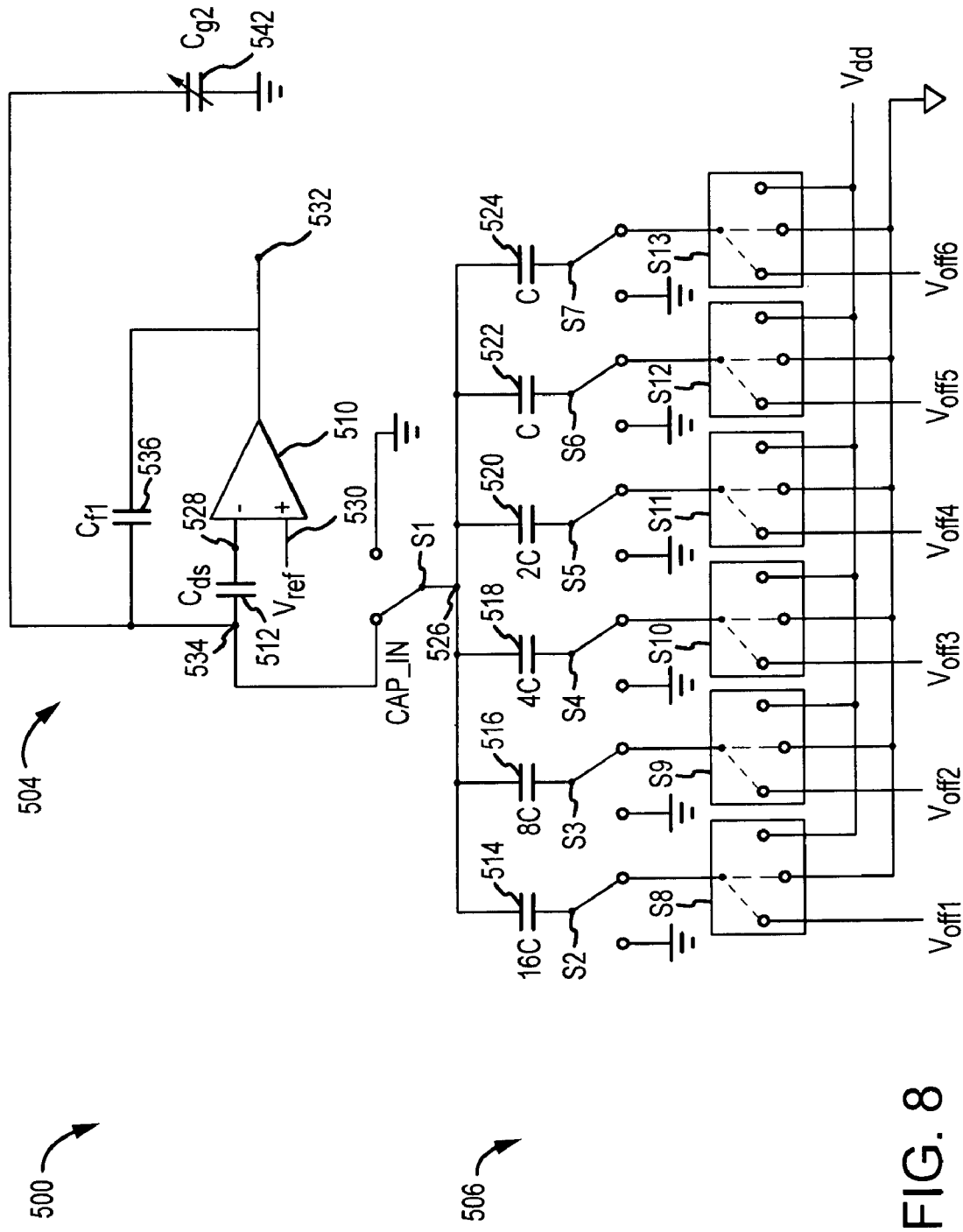

Referring again to FIG. 4, circuit 500 preferably remains in the final capacitance-to-voltage phase for a sufficient amount of time that allows operational amplifier 510 to generate the measured voltage at output node 532, where the measured voltage indicates the measured difference in capacitance of capacitive sensing circuit 502. Thereafter, process 400 continues by arranging the elements of circuit 500 into an amplification topology and configuration (task 408). In this regard, FIG. 8 is a circuit diagram that illustrates circuit 500 arranged for operation in the amplification phase (also referred to here as Phase Two).

For Phase Two, circuit 500 is reconfigured by disconnecting node 508 from feedback node 534, thus isolating capacitive sensing circuit 502 from the remaining elements of circuit 500. For this reason, capacitive sensing circuit 502 is not shown in FIG. 8. In addition to disconnecting node 508 from feedback node 534, the amplification topology is achieved by removing load capacitance 542 from between output node 532 and analog ground and instead connecting it between feedback node 534 and analog ground, as depicted in FIG. 8. In other words, the conductor of load capacitance 542 that was previously connected to output node 532 is now connected to analog ground, while the other conductor of load capacitance 542 is now connected to feedback node 534 (rather than analog ground).

The feedback path of operational amplifier 510 is arranged as follows during Phase Two. Feedback capacitor 536 remains in place between feedback node 534 and output node 532 (see also FIG. 7). During Phase Two, output node 532 is left floating, and operational amplifier 510 amplifies the input sample.

Shared capacitor bank 506 is utilized for offsetting capacitance during Phase Two. Accordingly, input switch S1 is set such that the CAP_IN node is connected to feedback node 534. In other words, shared capacitor bank 506 now serves as an input circuit for C2V/AMP circuit 504. For Phase Two, capacitor switches S2-S7 remain in their previous states (described above for Phase One). Reference switches S8-S13, however, are individually set to achieve the desired offset conditions. More specifically, the common terminal of each reference switch is connected to zero volts (ground) or to a respective offset voltage. In other words, reference switch S8 selects ground or Voff1, reference switch S9 selects ground or Voff2, reference switch S10 selects ground or Voff3, reference switch S11 selects ground or Voff4, reference switch S12 selects ground or Voff5, and reference switch S13 selects ground or Voff6. The dashed switch lines in FIG. 8 represent the two possible options for reference switches S8-S13.

In practice, predetermined trim codes or preprogrammed configuration settings will determine whether a given reference switch is connected to ground or its respective offset voltage during Phase Two. The different offset voltages corresponding to the reference switches S8-S13 may also be determined a priori in accordance with an initialization procedure or test scan of the host device. For example, Voff1 may be equal to Vref, and Voff2 may be equal to $$\frac{Vref}{2}.$$

The other offset voltages can be binary-weighted in a similar manner. This scheme allows each device to be configured and programmed to provide an appropriate offset capacitance for use during Phase Two—the offset capacitance will typically vary from one device to another. Once the desired offset configuration is determined and programmed, that configuration will be used whenever Phase Two is performed to inject or subtract the desired amount of charge. In other words, the settings for reference switches S8-S13 need not be recalculated or changed during normal operation of circuit 500. This allows the capacitors to be charged in accordance with the particular offset voltage of operational amplifier 510.

Figure 9:
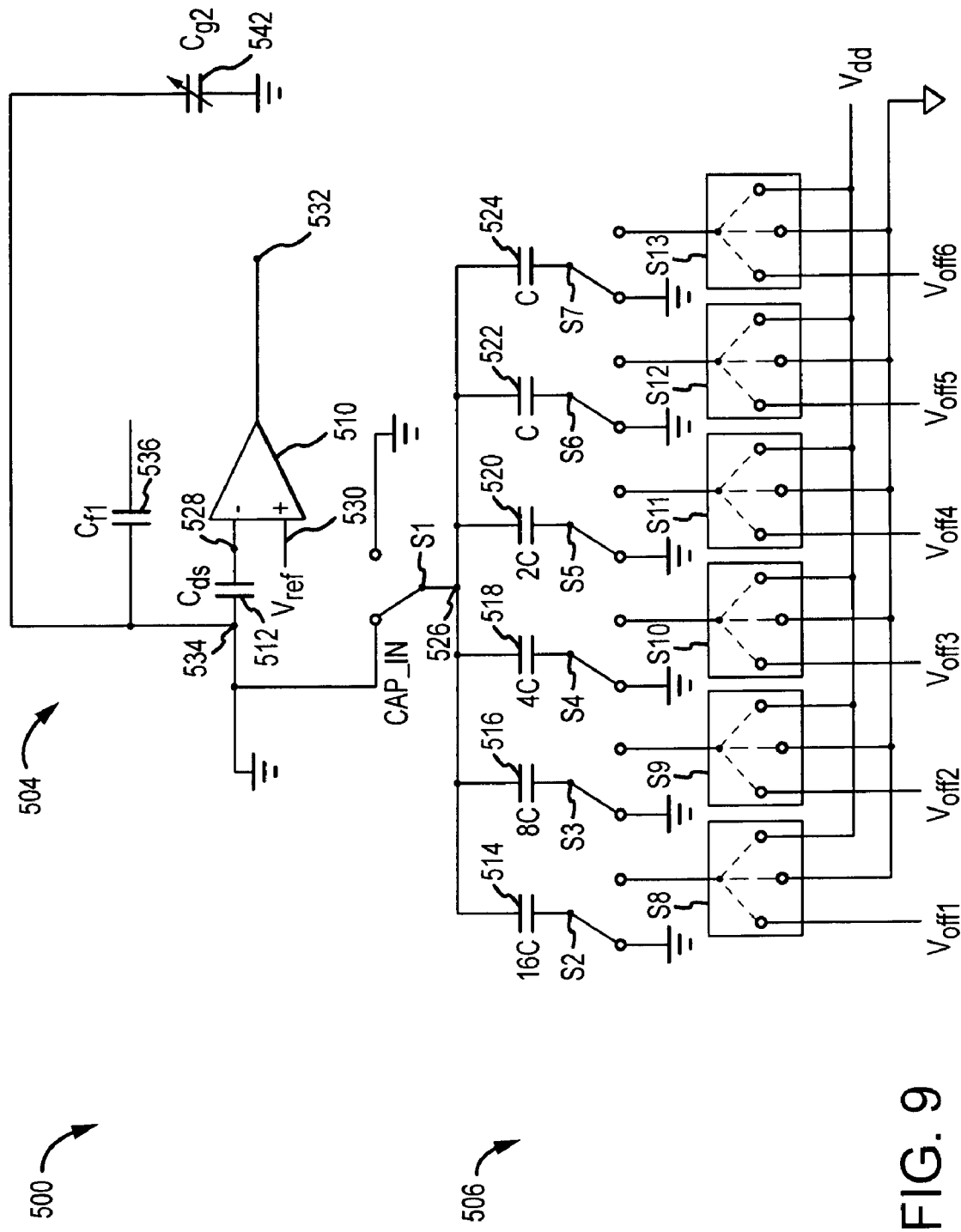

Referring again to FIG. 4, circuit 500 preferably remains in Phase Two for a sufficient amount of time that allows operational amplifier 510 to amplify the previously measured voltage and generate a first amplified voltage at output node 532. Thereafter, process 400 continues by rearranging the elements of circuit 500 into a SAR sample topology and configuration (task 410), also referred to here as Phase Three. In this regard, FIG. 9 is a circuit diagram that illustrates circuit 500 arranged for operation in Phase Three. Capacitive sensing circuit 502 remains isolated from the remainder of circuit 500, as described above for Phase Two.

For Phase Three, C2V/AMP circuit 504 is rearranged and/or switched in the following manner. Feedback capacitor 536 is disconnected from output node 532 and/or from feedback node 534 such that it is not in the feedback path of operational amplifier 510. Load capacitance 542 remains connected between feedback node 534 and analog ground. However, analog ground is also applied to feedback node 534, as depicted in FIG. 9. This causes load capacitance 542 to be reset.

At this time, shared capacitor bank 506 need not be used for offsetting purposes. Accordingly, all of the capacitor switches S2-S7 are switched to analog ground. Notably, reference switches S8-S13 may be set to any arbitrary position during Phase Three because they have been isolated from the capacitors in shared capacitor bank 506. This arrangement resets all of the capacitors in shared capacitor bank 506 by connecting both ends of the capacitors to analog ground (via input switch S1 and via capacitor switches S2-S7). Such resetting prepares the capacitors for the SAR operation to be performed on the next analog voltage sample.

Figure 10:
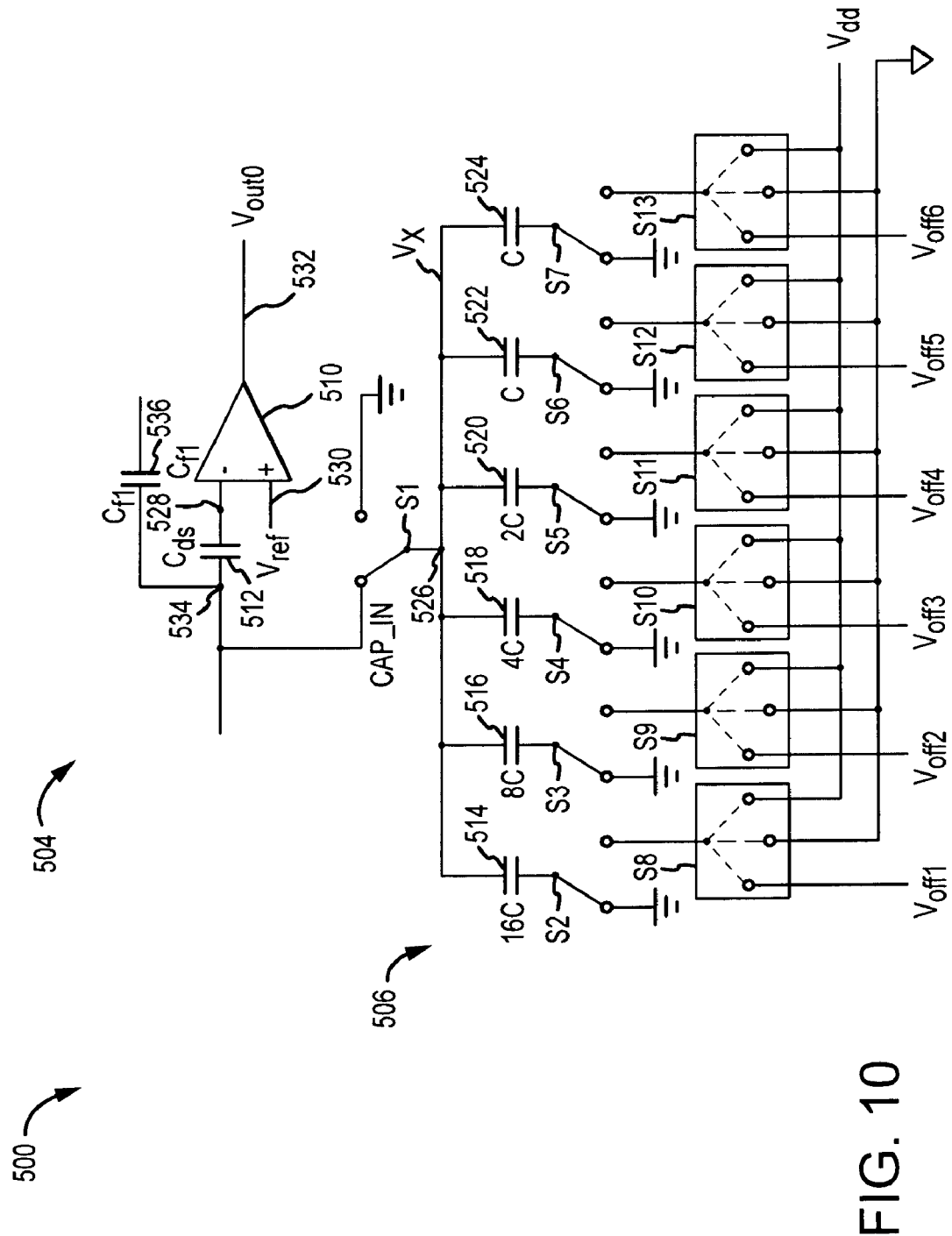

Referring again to FIG. 4, circuit 500 preferably remains in Phase Three for a sufficient amount of time that allows sampling of the analog voltage that will be converted into a digital representation. Thereafter, this embodiment of process 400 continues with the SAR ADC procedure by performing an appropriate polarity decision (task 412). This polarity decision is referred to here as Phase Four. For this embodiment, the most significant bit (MSB) is also determined during Phase Four. In this regard, FIG. 10 is a circuit diagram that illustrates circuit 500 arranged for operation in Phase Four. Capacitive sensing circuit 502 is not shown in FIG. 10 because it remains isolated from the remainder of circuit 500, as described above.

For Phase Four, shared capacitor bank 506 is used for SAR ADC purposes (i.e., shared capacitor bank 506 is utilized in a successive approximation register), and circuit 500 is rearranged and/or switched in the following manner. Capacitor switches S2-S7 remain in their previous states—all connected to analog ground. Feedback capacitor 536 remains disconnected from output node 532 and/or from feedback node 534 as described above for Phase Three. Notably, however, load capacitance 542 is disconnected from feedback node 534. For this reason, load capacitance 542 is not shown in FIG. 10. Analog ground is no longer applied to feedback node 534, and instead feedback node 534 now receives the voltage at common capacitor node 526 (labeled Vx in FIG. 10) as an input. At this time, operational amplifier 510 functions as a comparator with respect to the voltage present at inverting input node 528 and the voltage present at noninverting input node 530 (i.e., analog ground). The voltage present at output node 532 represents the most significant bit (MSB) of the digital output.

The voltage at output node 532 also determines the polarity of the input signal. In this regard, operational amplifier 510 performs a voltage comparison (query task 414). If Vx (i.e., −Vout0) is less than analog ground, then Polarity=1 (task 416). When Polarity=1, reference switches S8-S13 are set such that they are connected to Vdd for subsequent SAR operations. On the other hand, if Vx is not less than analog ground, then Polarity=0 (task 418). When Polarity=0, reference switches S8-S13 are set such that they are connected to ground (i.e., zero volts) for subsequent SAR operations. Thereafter, process 400 continues with the SAR operation to determine the remaining bits in the digital expression (task 420). During task 420, switches S2-S7 are individually actuated as necessary to allow C2V/AMP circuit 504 to perform voltage comparisons on residual voltages in accordance with conventional SAR techniques.

In summary, systems, devices, and methods configured in accordance with exemplary embodiments relate to:

A capacitance-to-voltage interface circuit comprising: a capacitive sensing circuit; an amplification circuit adapted for selective coupling to the capacitive sensing circuit; a capacitor bank comprising a plurality of binary-weighted capacitors; and a switching architecture associated with the capacitive sensing circuit, the amplification circuit, and the capacitor bank; wherein the switching architecture reconfigures the capacitance-to-voltage interface circuit for operation in an amplification phase during which the capacitor bank is utilized for offsetting capacitance of the amplification circuit, and for operation in an analog-to-digital conversion phase during which the capacitor bank is utilized in a successive approximation register. The circuit may further comprise an input switch for the capacitor bank, wherein the input switch selectively connects the capacitor bank to either analog ground or to the amplification circuit. The amplification circuit may comprise an operational amplifier having a noninverting input node and an inverting input node, the amplification circuit may comprise an offset capacitor coupled between the inverting input node and a feedback node, and the input switch can selectively connect the capacitor bank to either analog ground or to the feedback node. In some embodiments, each capacitor in the capacitor bank has its first conductor coupled to a common capacitor node of the capacitor bank, and each capacitor in the capacitor bank has its second conductor selectively coupled to either analog ground, a respective offset voltage, zero volts, or an upper reference voltage. In some embodiments, the upper reference voltage is a supply voltage (Vdd), and analog ground is $$\frac{Vdd}{2}.$$

In certain embodiments, the circuit operates with a supply voltage (Vdd), the upper reference voltage is $$+\frac{Vdd}{2},$$

and analog ground is $$-\frac{Vdd}{2}.$$

In certain embodiments, for operation in the amplification phase each capacitor in the capacitor bank has its second conductor connected to either its respective offset voltage or zero volts. In some embodiments, for operation in the analog-to-digital conversion phase each capacitor in the capacitor bank has its second conductor connected to either analog ground, zero volts, or the upper reference voltage.

A capacitance-to-voltage interface circuit comprising: an operational amplifier having a noninverting input node and an inverting input node; an offset capacitor coupled between the inverting input node and a feedback node; a plurality of binary-weighted capacitors, each having a first conductor connected to a common capacitor node, and each having a second conductor that can be selectively connected to either an analog reference voltage, a respective offset voltage, zero volts, or an upper reference voltage; and a switching architecture associated with the operational amplifier and the capacitors, the switching architecture being configured to change the topology of the interface circuit for operation in a plurality of different phases, including an amplification phase and an analog-to-digital conversion phase; wherein during the amplification phase the common capacitor node is connected to the feedback node, and the second conductor of each capacitor is connected to either its respective offset voltage or zero volts; and during the analog-to-digital conversion phase the common capacitor node is connected to the feedback node, and the second conductor of each capacitor is connected to either the analog reference voltage, zero volts, or the upper reference voltage. In some embodiments, the analog-to-digital conversion phase follows the amplification phase. In certain embodiments, during the amplification phase the capacitors are charged in accordance with an offset voltage of the operational amplifier. In certain embodiments, during the analog-to-digital conversion phase the capacitors are utilized in a successive approximation register.

In a capacitance-to-voltage interface circuit comprising a capacitive sensing cell having a first sensing capacitor coupled in series with a second sensing capacitor, an operational amplifier having an inverting input node, a noninverting input node that receives an analog reference voltage, and an output node, an offset capacitor coupled between the inverting input node and a feedback node, a first feedback capacitor coupled to the feedback node, a load capacitor for the operational amplifier, and a capacitor bank comprising a plurality of binary-weighted capacitors, a method of performing capacitance-to-voltage conversion. The method involves: arranging the interface circuit into an amplification topology; charging the capacitor bank while the interface circuit is in the amplification topology and in accordance with an offset voltage of the operational amplifier; rearranging the interface circuit into a successive approximation register (SAR) sample topology, wherein each capacitor in the capacitor bank is coupled between the feedback node and the analog reference voltage; resetting the capacitor bank while the interface circuit is in the SAR sample topology; rearranging the interface circuit into a SAR topology; and performing a SAR analog-to-digital operation while the interface circuit is in the SAR topology. In some embodiments, arranging the interface circuit into the amplification topology comprises: connecting the feedback capacitor between the feedback node and the output node of the operational amplifier; connecting the load capacitor between the feedback node and the analog reference voltage; and connecting each capacitor in the capacitor bank between the feedback node and a respective offset voltage, or between the feedback node and zero volts. In certain embodiments, rearranging the interface circuit into the SAR sample topology comprises: disconnecting the feedback capacitor from between the feedback node and the output node of the operational amplifier; applying the analog reference voltage to the feedback node; and connecting each capacitor in the capacitor bank between the feedback node and the analog reference voltage. In certain embodiments, rearranging the interface circuit into the SAR topology comprises: disconnecting the load capacitor from between the feedback node and the analog reference voltage; removing the analog reference voltage from the feedback node; and connecting each capacitor in the capacitor bank between the feedback node and the analog reference voltage, or between the feedback node and zero volts, or between the feedback node and an upper reference voltage. The method may further comprise: arranging the interface circuit into a reset topology prior to the amplification topology; and resetting the interface circuit while it is in the reset topology. In some embodiments, arranging the interface circuit into the reset topology comprises: connecting the feedback capacitor between the feedback node and the analog reference voltage; connecting the inverting input node of the operational amplifier to the output node of the operational amplifier; connecting the load capacitor between the output node and the analog reference voltage; and connecting the analog reference voltage across each capacitor in the capacitor bank. In such embodiments, the method may further comprise rearranging the interface circuit into a first capacitance-to-voltage topology following the reset topology, wherein rearranging the interface circuit into the first capacitance-to-voltage topology comprises connecting the capacitive sensing cell to the feedback node. Such a method may further comprise rearranging the interface circuit into a second capacitance-to-voltage topology following the first capacitance-to-voltage topology, wherein rearranging the interface circuit into the second capacitance-to-voltage topology comprises: reversing the polarity of the capacitive sensing cell; disconnecting the inverting input node of the operational amplifier from the output node of the operational amplifier; disconnecting the feedback capacitor from between the feedback node and the analog reference voltage; and connecting the feedback capacitor between the feedback node and the output node of the operational amplifier.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. A capacitance-to-voltage interface circuit comprising:
   a capacitive sensing circuit;
   an amplification circuit adapted for selective coupling to the capacitive sensing circuit;
   a capacitor bank comprising a plurality of binary-weighted capacitors, wherein each capacitor in the capacitor bank has its first conductor coupled to a common capacitor node of the capacitor bank, and each capacitor in the capacitor bank has its second conductor selectively coupled to either analog ground, a respective offset voltage, zero volts, or an upper reference voltage; and
   a switching architecture associated with and coupled to the capacitive sensing circuit, the amplification circuit, and the capacitor bank; wherein the switching architecture selectively couples the amplification circuit to the capacitive sensing circuit, and wherein the switching architecture reconfigures the capacitance-to-voltage interface circuit for operation in an amplification phase during which the capacitor bank is utilized for offsetting a capacitance of the amplification circuit, and for operation in an analog-to-digital conversion phase during which the capacitor bank is utilized in a successive approximation register.

2. The circuit of claim 1, wherein the switching architecture further comprises an input switch for the capacitor bank that selectively connects the common capacitor node of the capacitor bank to either analog ground or to the amplification circuit.

3. The circuit of claim 2, wherein:
   the amplification circuit comprises an operational amplifier having a noninverting input node and an inverting input node;
   the amplification circuit comprises an offset capacitor coupled between the inverting input node and a feedback node; and
   the input switch selectively connects the capacitor bank to either analog ground or to the feedback node.

4. The circuit of claim 1, wherein the upper reference voltage is a supply voltage (Vdd), and analog ground is Vdd/2.

5. The circuit of claim 1, wherein the circuit operates with a supply voltage (Vdd), the upper reference voltage is +Vdd/2, and analog ground is −Vdd/2.

6. The circuit of claim 1, wherein for operation in the amplification phase each capacitor in the capacitor bank has its second conductor connected to either its respective offset voltage or zero volts.

7. The circuit of claim 1, wherein for operation in the analog-to-digital conversion phase each capacitor in the capacitor bank has its second conductor connected to either analog ground, zero volts, or the upper reference voltage.

8. A capacitance-to-voltage interface circuit comprising:
   an operational amplifier having a noninverting input node and an inverting input node;
   an offset capacitor coupled between the inverting input node of the operational amplifier and a feedback node;
   a plurality of binary-weighted capacitors, each having a first conductor connected to a common capacitor node, and each having a second conductor that can be selectively connected to either an analog reference voltage, a respective offset voltage, zero volts, or an upper reference voltage; and a switching architecture associated with the operational amplifier and the capacitors, the switching architecture being configured to change the topology of the interface circuit for operation in a plurality of different phases, including an amplification phase and an analog-to-digital conversion phase;

wherein during the amplification phase the common capacitor node is connected to the feedback node, and the second conductor of each capacitor is connected to either its respective offset voltage or zero volts; and during the analog-to-digital conversion phase the common capacitor node is connected to the feedback node, and the second conductor of each capacitor is connected to either the analog reference voltage, zero volts, or the upper reference voltage. *

9. The interface circuit of claim 8, wherein the analog-to-digital conversion phase follows the amplification phase. *

10. The interface circuit of claim 8, wherein during the amplification phase the capacitors are charged in accordance with an offset voltage of the operational amplifier. *

11. The interface circuit of claim 8, wherein during the analog-to-digital conversion phase the capacitors are utilized in a successive approximation register. *

12. In a capacitance-to-voltage interface circuit comprising a capacitive sensing cell having a first sensing capacitor coupled in series with a second sensing capacitor, an operational amplifier having an inverting input node, a noninverting input node that receives an analog reference voltage, and an output node, an offset capacitor coupled between the inverting input node and a feedback node, a first feedback capacitor coupled to the feedback node, a load capacitor for the operational amplifier, and a capacitor bank comprising a plurality of binary-weighted capacitors, a method of performing capacitance-to-voltage conversion, the method comprising:

arranging the interface circuit into an amplification topology;

charging the capacitor bank while the interface circuit is in the amplification topology and in accordance with an offset voltage of the operational amplifier;

rearranging the interface circuit into a successive approximation register (SAR) sample topology, wherein each capacitor in the capacitor bank is coupled between the feedback node and the analog reference voltage;

resetting the capacitor bank while the interface circuit is in the SAR sample topology;

rearranging the interface circuit into a SAR topology; and performing a SAR analog-to-digital operation while the interface circuit is in the SAR topology.

13. The method of claim 12, wherein arranging the interface circuit into the amplification topology comprises:

connecting the feedback capacitor between the feedback node and the output node of the operational amplifier;

connecting the load capacitor between the feedback node and the analog reference voltage; and connecting each capacitor in the capacitor bank between the feedback node and a respective offset voltage, or between the feedback node and zero volts.

14. The method of claim 13, wherein rearranging the interface circuit into the SAR sample topology comprises:

disconnecting the feedback capacitor from between the feedback node and the output node of the operational amplifier;

applying the analog reference voltage to the feedback node; and connecting each capacitor in the capacitor bank between the feedback node and the analog reference voltage.

15. The method of claim 14, wherein rearranging the interface circuit into the SAR topology comprises:

disconnecting the load capacitor from between the feedback node and the analog reference voltage;

removing the analog reference voltage from the feedback node; and connecting each capacitor in the capacitor bank between the feedback node and the analog reference voltage, or between the feedback node and zero volts, or between the feedback node and an upper reference voltage.

16. The method of claim 12, further comprising:

arranging the interface circuit into a reset topology prior to the amplification topology; and resetting the interface circuit while it is in the reset topology.

17. The method of claim 16, wherein arranging the interface circuit into the reset topology comprises:

connecting the feedback capacitor between the feedback node and the analog reference voltage;

connecting the inverting input node of the operational amplifier to the output node of the operational amplifier;

connecting the load capacitor between the output node and the analog reference voltage; and connecting the analog reference voltage across each capacitor in the capacitor bank.

18. The method of claim 17, further comprising rearranging the interface circuit into a first capacitance-to-voltage topology following the reset topology, wherein rearranging the interface circuit into the first capacitance-to-voltage topology comprises connecting the capacitive sensing cell to the feedback node.

19. The method of claim 18, further comprising rearranging the interface circuit into a second capacitance-to-voltage topology following the first capacitance-to-voltage topology, wherein rearranging the interface circuit into the second capacitance-to-voltage topology comprises:

reversing the polarity of the capacitive sensing cell;

disconnecting the inverting input node of the operational amplifier from the output node of the operational amplifier;

disconnecting the feedback capacitor from between the feedback node and the analog reference voltage; and connecting the feedback capacitor between the feedback node and the output node of the operational amplifier.

* * * * *